(12) United States Patent
Ding et al.

(10) Patent No.: US 11,447,165 B2
(45) Date of Patent: Sep. 20, 2022

(54) TRAIN WINDOW STRUCTURE AND TRAIN WITH TRAIN WINDOW STRUCTURE

(71) Applicant: CRRC QINGDAO SIFANG CO., LTD., Qingdao (CN)

(72) Inventors: Sansan Ding, Qingdao (CN); Yali Jia, Qingdao (CN); Kainan Mao, Qingdao (CN); Peng Gao, Qingdao (CN); Shanshan Wang, Qingdao (CN); Yu Zeng, Qingdao (CN); Zhong Li, Qingdao (CN); Yuwen Liu, Qingdao (CN); Zhenzhong Wang, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 592 days.

(21) Appl. No.: 16/327,004

(22) PCT Filed: Sep. 30, 2017

(86) PCT No.: PCT/CN2017/104995
§ 371 (c)(1),
(2) Date: Feb. 21, 2019

(87) PCT Pub. No.: WO2018/082427
PCT Pub. Date: May 11, 2018

(65) Prior Publication Data
US 2021/0284207 A1   Sep. 16, 2021

(30) Foreign Application Priority Data

Nov. 3, 2016 (CN) .......................... 201610958865.8
Nov. 4, 2016 (CN) .......................... 201610961929.X

(51) Int. Cl.
*B61L 15/00* (2006.01)
*B32B 17/10* (2006.01)
(Continued)

(52) U.S. Cl.
CPC ...... *B61L 15/009* (2013.01); *B32B 17/10036* (2013.01); *B32B 17/1077* (2013.01);
(Continued)

(58) Field of Classification Search
CPC ........... B32B 17/00–1099; B61D 25/00; B60J 1/00–2097; B60J 10/00–90
See application file for complete search history.

(56) References Cited

U.S. PATENT DOCUMENTS

| 5,622,580 A * | 4/1997 | Mannheim ........ B32B 17/10018 |
| | | 100/295 |
| 2005/0221098 A1* | 10/2005 | Azzopardi .......... C03C 17/3423 |
| | | 428/446 |

(Continued)

FOREIGN PATENT DOCUMENTS

| CN | 1662467 A | 8/2005 |
| CN | 2904955 Y | 5/2007 |

(Continued)

OTHER PUBLICATIONS

Machine translation of WO2014175188. Retrieved Sep. 22, 2021.*
(Continued)

*Primary Examiner* — Prashant J Khatri
(74) *Attorney, Agent, or Firm* — Cantor Colburn LLP

(57) ABSTRACT

A train window structure and a train with the train window structure, the train window structure comprises a train window frame; train window glass arranged on the train window frame and internally provided with a hollow structure; and a display arranged in the hollow structure to display information on the train window glass, and information is displayed on the display in the hollow structure and is provided for passengers.

16 Claims, 4 Drawing Sheets

(51) Int. Cl.
  *B61D 25/00* (2006.01)
  *G09F 21/04* (2006.01)
  *G09F 9/33* (2006.01)
  *H05K 5/00* (2006.01)

(52) U.S. Cl.
  CPC .. *B32B 17/10302* (2013.01); *B32B 17/10495* (2013.01); *B32B 17/10752* (2013.01); *B32B 17/10761* (2013.01); *B61D 25/00* (2013.01); *H05K 5/0017* (2013.01); *G09F 9/335* (2021.05); *G09F 21/049* (2020.05)

(56) References Cited

U.S. PATENT DOCUMENTS

2014/0314973 A1* 10/2014 Desroches ............... B60J 1/007 428/34
2016/0041331 A1    2/2016 Odulinski

FOREIGN PATENT DOCUMENTS

| CN | 202115531 U | 1/2012 |
| CN | 202126818 U | 1/2012 |
| CN | 102678024 A | 9/2012 |
| CN | 202788428 U | 3/2013 |
| CN | 202935355 U | 5/2013 |
| CN | 105102222 A | 11/2015 |
| CN | 106347392 A | 1/2017 |
| CN | 106379353 A | 2/2017 |
| CN | 106396429 A | 2/2017 |
| CN | 106494439 A | 3/2017 |
| CN | 206217897 U | 6/2017 |
| CN | 206217898 U | 6/2017 |
| CN | 206219445 U | 6/2017 |
| DE | 4009349 A1 | 9/1991 |
| WO | WO-2014175188 A1 * | 10/2014 ............. B60J 1/001 |

OTHER PUBLICATIONS

Machine translation of DE4009349A1. Retrieved Mar. 29, 2022.*
International Search Report for corresponding application PCT/CN2017/104995 filed Sep. 30, 2017; dated Jan. 3, 2018.
European Search Report for corresponding application 17 86 6791; dated Feb. 27, 2020.

* cited by examiner

TRAIN WINDOW STRUCTURE AND TRAIN WITH TRAIN WINDOW STRUCTURE

TECHNICAL FIELD

The disclosure relates to a technical field of locomotives, and particularly to a train window structure and a train with the train window structure.

BACKGROUND

With the continuous development of locomotives, in addition to considering security and reliability, comfort of a rail vehicle also needs to be improved. In a conventional art, a side window of the rail vehicle only has a function for people watch outside or inside. In addition, because of the existence of the window, other facilities which need to be set in the rail vehicle cannot be arranged at the window, so that the area of the window is wasted.

SUMMARY

The disclosure mainly aims to provide a train window structure and a train with the train window structure, and solve a problem in the conventional art that a train window has a single function.

In order to achieve the above purpose, according to one aspect of the disclosure, a train window structure is provided, the train window structure includes a train window frame; train window glass arranged on the train window frame and a hollow structure is provided inside of the train; and a display arranged in the hollow structure to display information on the train window glass.

In an exemplary embodiment, the display includes a light emitting panel which is matched with the train window glass.

In an exemplary embodiment, the light emitting panel includes an Organic Light Emitting Diode (OLED) panel.

In an exemplary embodiment, the train window glass includes outer layer glass and inner layer glass, the outer layer glass and the inner layer glass are oppositely arranged, and the hollow structure is formed between the outer layer glass and the inner layer glass.

In an exemplary embodiment, the train window structure further includes a connecting piece arranged on the train window frame, and the outer layer glass and the inner layer glass are connected through the connecting piece.

In an exemplary embodiment, the train window structure further includes a first sealant arranged in the hollow structure to seal a junction of the outer layer glass and the inner layer glass.

In an exemplary embodiment, the train window frame is provided with a first stopping convex rib, a first end of the connecting piece is abutted against the first stopping convex rib, the inner layer glass is arranged at the first end of the connecting piece, and the outer layer glass is arranged at a second end of the connecting piece.

In an exemplary embodiment, the train window frame is provided with a second stopping convex rib, the second stopping convex rib is provided away from the inner layer glass, and a sealing clamping groove is formed between the second stopping convex rib and the first stopping convex rib.

In an exemplary embodiment, the train window structure further includes a second sealant arranged in the sealing clamping groove to seal a gap formed between the first stopping convex rib and the inner layer glass.

According to another aspect of the disclosure, a train is provided, and the train includes the above train window structure.

By applying the technical scheme of the disclosure, since the train window structure in the disclosure is provided with the display, information is provided for passengers through the display in the hollow structure, and this makes the functions of the train window enriched.

BRIEF DESCRIPTION OF THE DRAWINGS

The accompanying drawings, which constitute a part of this application, are used to provide a further understanding of the disclosure, and the exemplary embodiments of the disclosure and the description thereof are used to explain the disclosure, but do not constitute improper limitations to the disclosure. In the drawings.

Figure 1:
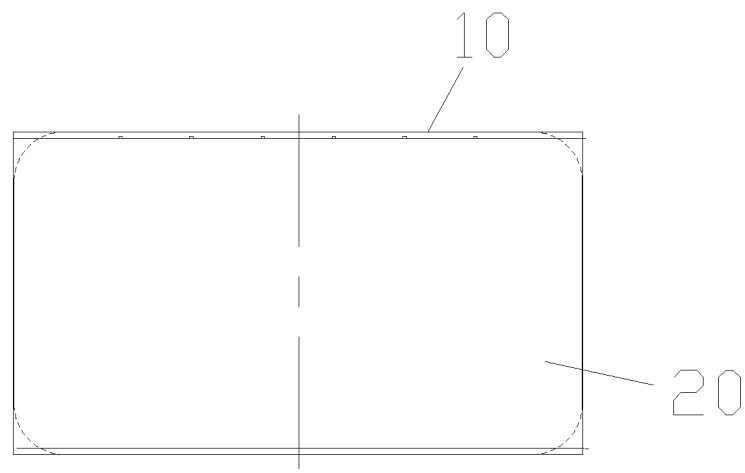
FIG. 1 schematically shows a structure diagram of an embodiment of a train window of the disclosure.

Herein, the above drawings include the following references:

10: train window frame; 11: first stopping convex rib; 12: second stopping convex rib; 13: sealing clamping groove;

20: train window glass; 21: hollow structure; 22: outer layer glass; 221: first polycarbonate plate; 222: second polycarbonate plate; 23: inner layer glass; 24: light emitting panel; 25: sealing strip;

30: connecting piece;

40: first sealant;

50: second sealant;

60: terminal;

70: power supply wire;

80: grounding wire exposure position;

90: power supply switch; 91: flat wire

DETAILED DESCRIPTION OF THE EMBODIMENTS

It is to be noted that embodiments in the application and features in the embodiments may be mutually combined in the case without conflicting. The disclosure is explained in detail with reference to the drawings in combination with the embodiments below.

It is to be understood that terms used herein only aim to describe specific implementation manners, and are not intended to limit exemplary implementations of the application. Unless otherwise directed by the context, singular forms of terms used herein are intended to include plural forms. Besides, it is further to be understood that when terms "contain" and/or "include" are used in the description, it is indicated that features, steps, operations, devices, assemblies and/or a combination thereof exist.

It is to be noted that specification and claims of the disclosure and terms 'first', 'second' and the like in the drawings are intended to distinguish similar objects, and are not necessarily to describe a specific sequence or a precedence order. It is to be understood that terms used in such a way may be exchanged under appropriate conditions, so that the embodiments of the disclosure described here can be implemented in a sequence other than the sequences graphically shown or described here. In addition, terms 'comprise', 'include' and variations thereof are intended to cover non-exclusive inclusions. For example, processes, methods, systems, products or devices containing a series of steps or units do not need to clearly show those steps or units, and may include other inherent steps or units of these processes, methods, products or devices, which are not clearly shown.

For ease of description, spatial relative terms such as "over", "above", "on an upper surface" and "upper" may be used herein for describing a spatial position relation between a device or feature and other devices or features shown in the drawings. It is to be understood that the spatial relative terms aim to contain different orientations in usage or operation other than the orientations of the devices described in the drawings. For example, if the devices in the drawings are inverted, devices described as "above other devices or structures" or "over other devices or structures" will be located as "below other devices or structures" or "under other devices or structures". Thus, an exemplary term "above" may include two orientations, namely "above" and "below". The device may be located in other different modes (rotated by 90 degrees or located in other orientations), and spatial relative descriptions used herein are correspondingly explained.

Now, the exemplary embodiments according to the disclosure will be described in detail with reference to the drawings. However, the exemplary embodiments may be implemented in multiple different modes, and are not intended to be limited by the described implementation modes herein. It is to be understood that the implementation modes are provided so that the disclosure is completely and totally disclosed, and the conceptions of the example implementation modes are adequately transmitted to those of ordinarily skill in the art, in the drawings, for clarity, the thicknesses of layers and areas may be enlarged, and the same reference is used for representing the same device, so that their description is omitted.

As shown in FIG. 1 to FIG. 5, according to one aspect of the disclosure, a train window structure is provided. The train window structure includes a train window frame 10, train window glass 20 and a display, the train window glass 20 is arranged on the train window frame 10, and a hollow structure 21 is provided inside of the train window glass 20, and the display is arranged in the hollow structure 21 and is used for displaying information on the train window glass 20. When the train window structure in the disclosure works, information is provided for passengers through the display in the hollow structure 21, and thus functions of the train window are enriched.

In order to prevent that the display is damaged as the display is collided and rubbed with the train window glass in a train running process, the display in the disclosure includes a light emitting panel 24 matched with the train window glass 20. Preferably, the light emitting panel 24 is fit for the train window glass, that is, no gap is formed between the display and the train window glass 20, so that the display is prevented from colliding with the train window glass in the train running process.

In order to enable the display in the disclosure to display more clearly, preferably, the light emitting panel 24 in the disclosure includes an Organic Light Emitting Diode (OLED) panel. Certainly, other devices meeting display requirements of the display in the disclosure may also be used. Preferably, at a normal state, that is, a no-signal state, the display in the disclosure is at a transparent state, passengers can watch outdoor scenery clearly, and when signals are input by a train control system, related contents are displayed on the display.

Figure 2:
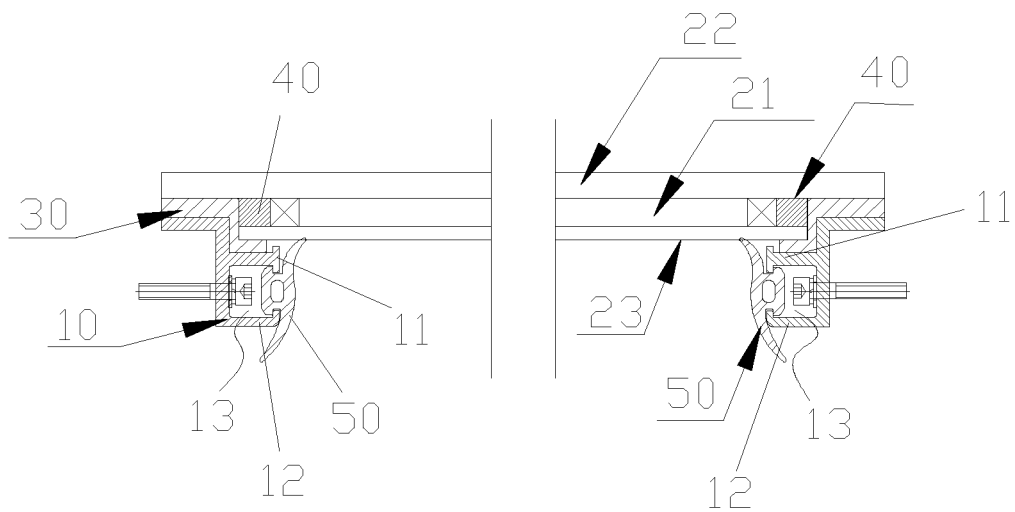
FIG. 2 schematically shows a section view of the train window without a part of train window glass of the embodiment of the disclosure.
Figure 3:
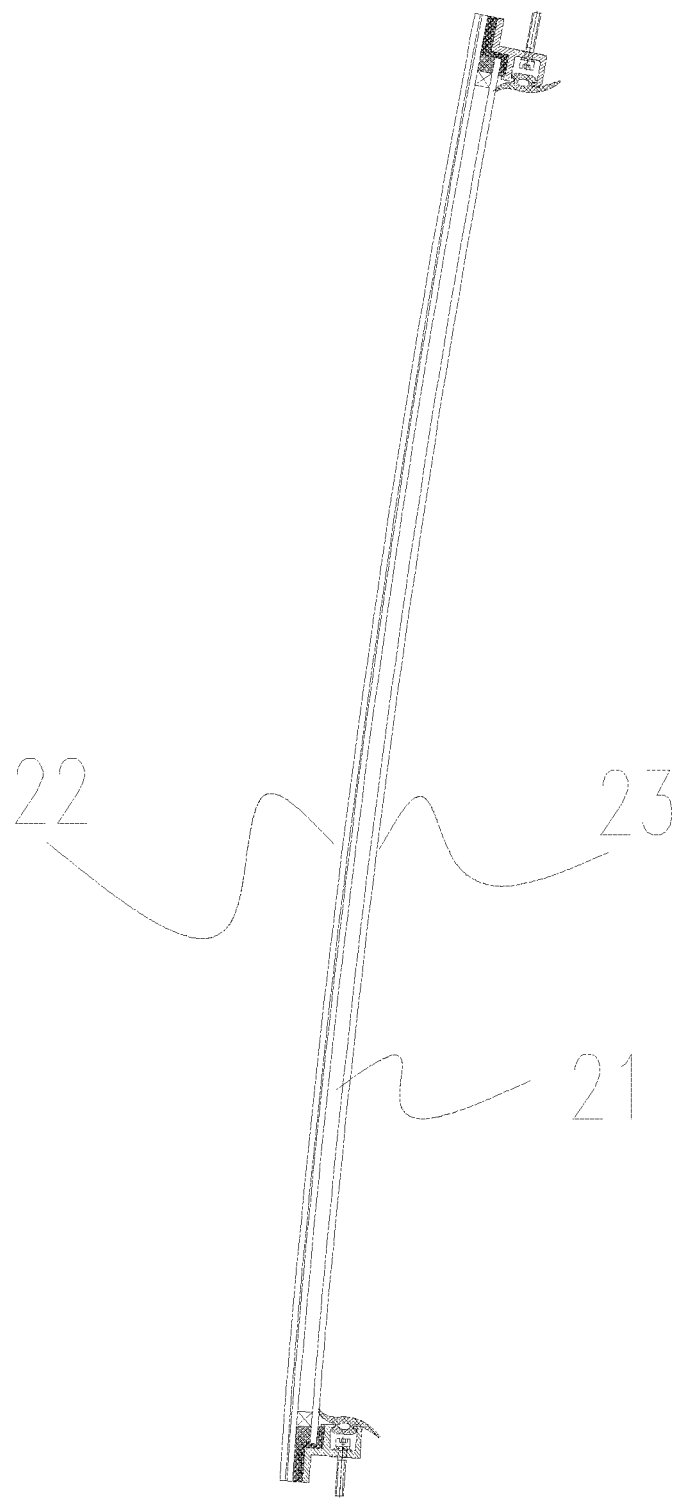
FIG. 3 schematically shows a whole section view of the embodiment of the train window of the disclosure.
Figure 4:
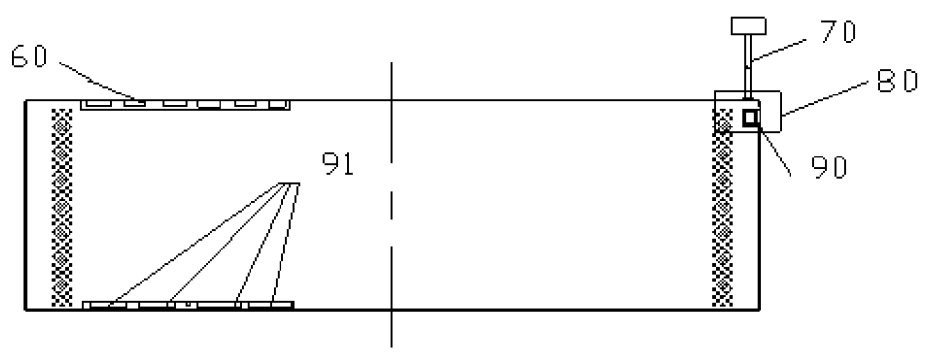
FIG. 4 schematically shows a structure diagram of a display case of the disclosure.
Figure 5:
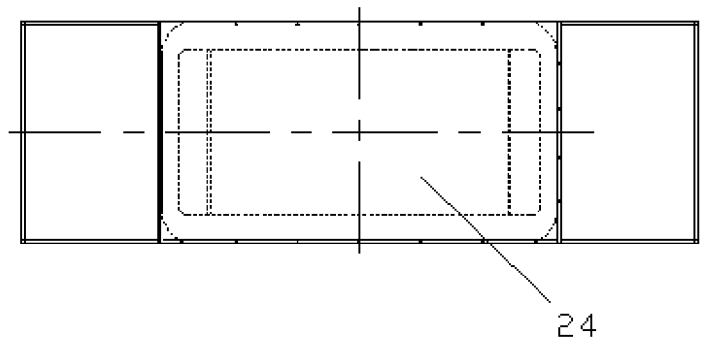
FIG. 5 schematically shows a structure diagram of the train window and a display of the disclosure.

As shown in FIG. 2, in order to better fix and install the display, the train window glass 20 in the disclosure includes outer layer glass 22 and inner layer glass 23, the outer layer glass 22 and the inner layer glass 23 are oppositely arranged, and the hollow structure 21 is formed between the outer layer glass 22 and the inner layer glass 23. When being installed, the display is installed in the hollow structure 21 by an operator and is fixed through the inner layer glass 23 and the outer layer glass 22.

In order to more stably connect the inner layer glass 23 with the outer layer glass 22, preferably, the train window structure in the disclosure further includes a connecting piece 30 arranged on the train window frame 10, and the outer layer glass 22 is connected with the inner layer glass 23 through the connecting piece 30. When being installed, the outer layer glass 22 is connected with the inner layer glass 23 through the connecting piece 30 by the operator.

In order to improve the connection stability of the inner layer glass and the outer layer glass, and meanwhile prevent external impurities from entering the hollow structure 21 to affect a display function of the display, preferably, the train window structure further includes a first sealant 40 arranged in the hollow structure 21 to seal a junction of the outer layer glass 22 and the inner layer glass 23. In operation, the inner layer glass 23 is further connected with the outer layer glass 22 through the sealant, the display is further fixed, and meanwhile external impurities such as water are prevented from entering the hollow structure.

In order to further fix the train window glass in the disclosure, preferably, the train window frame 10 in the disclosure is provided with a first stopping convex rib 11, a first end of the connecting piece 30 is abutted against the first stopping convex rib 11, the inner layer glass 23 is arranged at the first end of the connecting piece 30, and the outer layer glass 22 is arranged at a second end of the connecting piece 30. In operation, the outer layer glass 22 and the inner layer glass 23 are fixed by the train window frame 10 in the disclosure, movement of the connecting piece 30 is limited by the first stopping convex rib 11, and the outer layer glass 22 and the inner layer glass 23 are solidly installed.

In order to further prevent the external impurities from entering the hollow structure 21 between the outer layer glass 22 and the inner layer glass 23, the train window structure in the disclosure further includes a second sealant 50, and further sealing is achieved through the second sealant 50. In order to install the second sealant 50, the train window frame 10 in the disclosure is provided with a second stopping convex rib 12, the second stopping convex rib 12 is arranged away from the inner layer glass 23, and a sealing clamping groove 13 is formed between the second stopping convex rib 12 and the first stopping convex rib 11. When being installed, the second sealant 50 in the disclosure is arranged in the sealing clamping groove 13 to seal a gap formed between the first stopping convex rib 11 and the inner layer glass 23.

Preferably, the second sealant 50 in the disclosure is a sealing rubber strip, and certainly, other devices meeting sealing effects of the second sealant in the disclosure may also be used. A display case in the disclosure includes a terminal 60 for transmitting data, and a power supply wire for transmitting power, and the power supply wire 70 is arranged adjacent to a grounding wire exposure position 80 and the disclosure includes a power supply switch 90 and a flat wire 91.

At the normal state, that is, at the no-signal state, the display in the disclosure is at the transparent state, passengers can watch outdoor scenery clearly, and when signals are input by the train control system, video information such as multimedia films, cartoons and advertisements, and text information such as train speeds and station information are displayed on the display. The window has a large display screen and rich display information, and a train space is effectively utilized.

Figure 6:
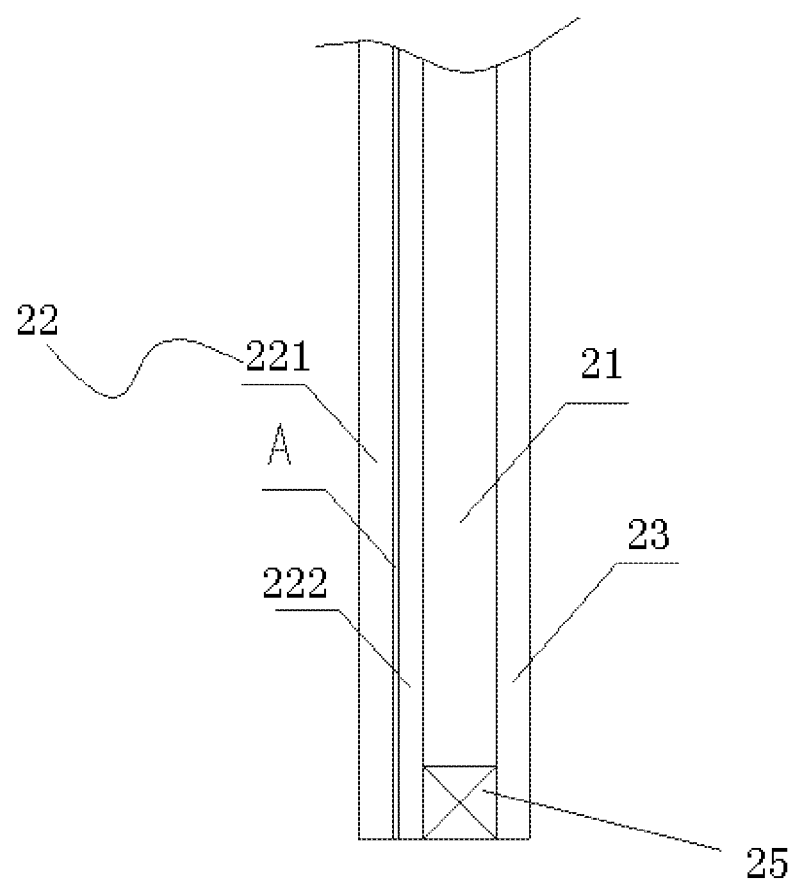
FIG. 6 shows a structural diagram of the embodiment of the train window glass of the disclosure.

According to another embodiment of the disclosure, as shown in FIG. 6, a glass structure is provided, and the glass structure is used on a train window.

Specifically, the glass structure includes outer layer glass 22, inner layer glass 23 and a sealing strip 25. The outer layer glass 22 and the inner layer glass 23 are oppositely arranged, and the outer layer glass 22 and the inner layer glass 23 are arranged in a distance. The outer layer glass 22 and the inner layer glass 23 are connected through the sealing strip 25, and a hollow structure 21 is formed among the sealing strip 25 and the outer layer glass 22 and the inner layer glass 23. Herein, the sealing strip 25 in the embodiment is equivalent to the first sealant 40 in the above embodiment.

In the embodiment, a seal-cleaning material layer is arranged on an outer surface of the outer layer glass 22, so that the glass structure has a self-cleaning function, the cleaning difficulty of the glass is reduced, meanwhile, the workload of regular glass surface cleaning is reduced, and increasingly scarce water resources are saved.

Herein, the outer layer glass 22 includes a first polycarbonate plate 221, the first polycarbonate plate 221 is arranged opposite to the inner layer glass 23, and the self-cleaning material layer is arranged on an outer surface of the first polycarbonate plate 221. As the outer layer glass 22 includes the first polycarbonate plate 221, a thickness of the outer layer glass 22 is effectively reduced, and the outer layer glass 22 has better sound and heat insulation properties.

The outer layer glass 22 further includes a Polyvinyl Butyral (PVB) membrane layer and a second polycarbonate plate 222. One surface of the PVB membrane layer is connected with an inner surface of the first polycarbonate plate 221, the other surface of the PVB membrane layer is connected with the second polycarbonate plate 222, and the second polycarbonate plate 222 is connected with the outer layer glass 22 through the sealing strip 25. Due to the arrangement, the outer layer glass 22 has a better energy saving effect, 99% or greater of ultraviolet light is expelled, comfort of passengers is improved, and aging of facilities in a train is effectively retarded.

Certainly, the outer layer glass 22 may also be made of a Polyurethane (PU) membrane layer and the second polycarbonate plate 222. One surface of the PU membrane layer is connected with the inner surface of the first polycarbonate plate 221, the other surface of the PU membrane layer is connected with the second polycarbonate plate 222, and the second polycarbonate plate 222 is connected with the outer layer glass 22 through the sealing strip 25. Due to the arrangement, the outer layer glass 22 has a better energy saving effect, 99% or greater of ultraviolet light is expelled, comfort of passengers is improved, and aging of facilities in a train is effectively retarded. Due to adoption of the polycarbonate plates, characteristics such as lightening are achieved, and the glass structure has better impact resistance.

In order to remarkably reduce a shielding coefficient of the glass structure and improve an energy saving effect of composite glass, nano ceramic membranes are arranged on surfaces of the first polycarbonate plate 221 and the second polycarbonate plate 222. Certainly, the nano ceramic membrane may be arranged on only one of the polycarbonate plates.

In order to improve heat insulating properties of the glass structure, the hollow structure 21 is filled with accommodated air or argon.

In order to better protect privacy of passengers, the inner layer glass 23 includes a unidirectional perspective membrane layer, and the unidirectional perspective membrane layer is arranged on an inner surface or an outer surface of the inner layer glass 23.

Preferably, the inner layer glass 23 has a thickness L, herein, L is greater than or equal to 3.5 mm and less than or equal to 4.5 mm. Therefore, the thickness of the glass structure is effectively reduced to reduce a weight of the train as a whole, the train is capable of meeting lightening standards, and herein, the thickness of the inner layer glass 23 is preferably 4 mm.

By using a plasma plating technology, outer surfaces of the polycarbonate plates are plated by a hydrophobic self-cleaning nano material, so that a contact angle theta, formed between the outer surface of the glass structure and water, is greater than 120 degrees, that is, a composite glass structure has a very good hydrophobic property. Herein, the self-cleaning material layer may be an anatase type titanium dioxide material layer. Self-cleaning material layers may be arranged one layer or more.

The glass structure in the above embodiment may be applicable to a technical field of train facilities, that is, according to another aspect of the disclosure, a train is provided. The train includes a glass structure, and the glass structure is the glass structure in the above embodiment. The glass structure includes outer layer glass 22, inner layer glass 23 and a sealing strip 25. The outer layer glass 22 and the inner layer glass 23 are oppositely arranged, and the outer layer glass 22 and the inner layer glass 23 are arranged in a distance. The outer layer glass 22 and the inner layer glass 23 are connected through the sealing strip 25, and a hollow structure 21 is formed among the sealing strip 25 and the outer layer glass 22 and the inner layer glass 23. A self-cleaning material layer is arranged on an outer surface of the outer layer glass 22. Therefore, the glass structure has a self-cleaning function, and cleaning difficulties of glass are reduced.

In the embodiment, the PVB membrane or the PU membrane has properties of lightening and very good sound insulation. Inner surfaces of the polycarbonate plates are plated by nano ceramic membranes, so that a shielding coefficient of the glass is remarkably reduced, and an energy-saving effect of the composite glass is improved. The outer surface of the outer layer glass is plated by a LOW-Emissivity (LOW-E) membrane, so that a heat insulating property of the composite glass is remarkably improved. One of the inner surface and the outer surface of the inner layer glass may be selected to be plated by a unidirectional perspective membrane, so that the composite glass has a unidirectional perspective function, and privacy of the passengers is conveniently protected. The glass structure has functions of self cleaning, unidirectional perspective and the like, and has multiple properties such as sound insulation, heat insulation, strength, ultraviolet light prevention, infrared ray prevention, energy conservation and impact resistance prior to those of common hollow glass or laminated glass.

Carbon fiber (CF for short) is a novel fiber material of which a carbon content is above 95% and is made of a high-strength and high-flux fiber. The carbon fiber is composed of organic fibers such as a flaky graphite microcrystal constructed in an axial direction of the fiber, and is a microcrystal graphite material prepared through carbonization and graphitization. The carbon fiber is "soft outside and rigid inside", has a mass lighter than that of a metal aluminum, strength greater than that of steel, in addition has properties of corrosion resistance and high flux, and is an important material in both national defense and military industry and civil use. The carbon fiber has not only inherent characteristics of a carbon material, but also soft processability of a weaving fiber, and is a reinforced fiber of a new generation.

The carbon fiber has multiple excellent properties, is high in axial strength and flux, low in density, high in specific performance, free of creepage and good in ultrahigh temperature resistance and fatigue resistance in a non-oxidation environment, has specific heat and conductivity within those of nonmetals and metals, is small in thermal expansion and has anisotropism, is good in corrosion resistance, good in X-ray permeability, good in electric and heat conductivity, good in electromagnetic shielding property, and the like.

Compared with a conventional glass fiber, the carbon fiber has a Young modulus which is more than three times of that of the conventional glass fiber; compared with a Kevlar fiber, the Young modulus of the carbon fiber is about two times of that of the Kevlar fiber, and the carbon fiber is not dissolved or swelled in an organic solvent, an acid or an alkali, and is outstanding in corrosion resistance.

The carbon fiber is an inorganic high polymer fiber of which a carbon content is greater than 90%. A carbon fiber of which a carbon content is greater than 99% is called as a graphite fiber. The carbon fiber has a microcosmic structure similar to that of artificial graphite and is a disordered graphite structure. A distance among different layers of the carbon fiber is about 3.39-3.42 A, different carbon atoms on different parallel layers are not arranged as regular as those of graphite, and layers are connected through Van der Waals' force.

Generally, the structure of the carbon fiber is regarded as being composed of two-dimensional ordered crystals and pores, and herein, properties of the carbon fiber are greatly affected by contents, sizes and distribution of the pores.

When a porosity is lower than a critical value, interlayer shearing strength, bending strength and tension strength of a carbon fiber composite material are not remarkably affected by the porosity. Research shows that a critical porosity which causes mechanical property degradation of a material is 1%-4%. When a pore volume content is within 0%-4%, once the pore volume content is increased by 1%, the interlayer shearing strength is degraded by about 7%. Study on a carbon fiber epoxy resin and a carbon fiber bimaleamine resin laminated plate shows that when a porosity exceeds for 0.9%, the interlayer shearing strength starts to be degraded. Tests show that pores are mainly distrusted among fiber bundles and on interlayer interfaces. In addition, the higher a pore content, the greater a size of a pore, and in addition an area of an interlayer interface of a laminated plate is remarkably reduced. When being stressed, the material is easily damaged along layers, and the fact is a reason that the interlayer shearing strength is sensitive to pores. In addition, a pore part is a stress centralized area and has weak bearing capability, so that when being stressed, the pores are expanded to form long cracks, and thus damage is caused.

Even two laminated plates with a same porosity (with different pre-soaking methods and manufacturing modes in a same maintenance cycle) have completely different mechanical behaviors. Specific values that mechanical properties are degraded along with increase of porosities are different, that is, the porosity is large in discreteness and poor in repeatability in influencing mechanical properties. Because of a great number of variable factors, influence of the porosity upon a mechanical property of a composite material laminated plate is a very complex problem. The factors include shapes, sizes and positions of pores, mechanical properties of fibers, substrates and interferences, and static or dynamic loads.

Compared with porosities and length-to-width ratios of the pores, pore sizes and distribution have great influence on mechanical properties, and large porosities (an area is greater than $0.03$ mm$^2$) have adverse influence on the mechanical properties, and the consequence attributes to influence of pores upon crack expansion in a glue-enriched area among layers.

The carbon fiber has two main characteristics of great tension resistance of a carbon material and flexibility and processability of a fiber, and the carbon fiber is a novel material with excellent mechanical properties. The carbon fiber has tension strength of about 2-7 GPa, and a tension modulus of about 200-700 GPa. A density of the carbon fiber is about 1.5-2.0 g/cm$^3$, and the density is mainly determined by a carbonization treatment temperature in addition to an original fiber structure. Generally, the density may be up to 2.0 g/cm$^3$ after graphitization treatment at a high temperature of 3000 DEG C. Furthermore because of a very light weight, the carbon fiber has a specific gravity even lighter than that of aluminum, that is, the specific weight is less than ¼ of that of steel, and the carbon fiber has specific strength which is 20 times of that of iron. The carbon fiber has a thermal expansion coefficient which is different from those of other fibers and has a characteristic of anisotropism. Generally, the carbon fiber has a specific heat capacity of 7.12. Heat conductivity is degraded along with increase of temperatures, is a negative value (0.72-0.90) in a direction parallel to the fiber, and is a positive value (32-22) in a direction perpendicular to the fiber. The carbon fiber has specific resistance related to a type of the fiber, at 25 DEG C., the carbon fiber has a high modulus of 775, and a high-strength carbon fiber has a high modulus of 1500 per centimeter.

Therefore, the carbon fiber has highest specific strength and a specific modulus of all high-performance fibers. Compared with metallic materials such as titanium, steel and aluminum, the carbon fiber has characteristics of being high in strength, high in modulus, low in density and small in linear expansion coefficient in physical properties, and may be called as the king of novel materials.

In addition to characteristics of common carbon materials, the appearance of the carbon fiber has remarkable anisotropic softness, the carbon fiber may be processed into different fabrics, furthermore because of the small specific gravity, the carbon fiber has very high strength in an axial direction, and a carbon fiber reinforced epoxy resin composite material has highest comprehensive indexes such as strength and a specific modulus in a conventional structural material. A carbon fiber resin composite material has tension strength which is generally 3500 MPa or greater and is 7-9 times of that of steel, and has an anti-tension elastic modulus of 230-430 GPa which is also higher than that of steel; therefore, the specific strength of a Carbon Fiber Reinforced Plastic (CFRP), that is, a ratio of the strength of the material to a density of the material, is up to 2000 MPa or greater, specific strength of A3 steel is only about 59 MPa, and the material has a specific modulus which is also greater than that of steel. Compared with a conventional glass fiber, the carbon fiber has a Young modulus (which refers to a physical quantity for representing tension resistance or pressure resistance of a substance material within an elasticity limit) which is more than three times of that of the glass fiber; compared with a Kevlar fiber, the carbon fiber has a Young modulus which is about two times of that of the Kevlar fiber. Tests on a carbon fiber epoxy resin laminated plate show that along with increase of the porosity, the strength and the modulus are both degraded. The porosity has great influence upon interlayer shearing strength, bending strength and a bending modulus; the tension strength is slowly degraded along with increase of the porosity; the tension modulus is slightly affected by the porosity.

The carbon fiber also has a very good fiber degree (one of expression modes of the fiber degree is a grammage of a long fiber of 9000 m), generally the fiber degree is only about 19 g, and tensile force is as high as 300 kg per micrometer. Nearly no other material has a series of excellent properties as rich as those of the carbon fiber, so that the carbon fiber is applied to fields with strict requirements on indexes, rigidity, weights, fatigue properties and the like. When being free of air or an oxidant, the carbon fiber is capable of enduring a high temperature of 3000 DEG C. or greater and has outstanding thermal resistance; the strength of the carbon fiber starts to be degraded only when the temperature is greater than 1500 DEG C. when being compared with those of other materials, and in addition, the higher the temperature is, the greater the fiber strength is. The carbon fiber has radial strength inferior to axial strength, so that the carbon fiber is in fear of intense radial force (that is, the carbon fiber cannot be tied into a knot), and whisker performance of other materials is already greatly degraded. In addition, the carbon fiber has good low temperature resistance, for example, is not embrittled even at a liquid nitrogen temperature.

The carbon fiber has chemical properties similar to those of carbon, and is inert for common alkalis except being oxidized by an intense oxidant. Conspicuous oxidation is resulted when the carbon fiber is in the air at a temperature higher than 400 DEG C., and CO and $CO_2$ are generated. The carbon fiber has good corrosion resistance in common organic solvents, acids and alkalis, is not dissolved or swelled, has outstanding corrosion resistance and barely has a problem of rusting. A scholar soaked a Polyacrylonitrile (PAN)-based carbon fiber into a strong alkali sodium hydroxide solution in 1981, and more than 30 years later, the carbon fiber is still kept at a fiber form. However, the carbon fiber has poor impact resistance, is easily damaged and is easily oxidized under the action of a strong acid, the carbon fiber has electromotive force of a positive value, and an aluminum alloy has electromotive force of a negative value. When a carbon fiber composite material is combined and used with the aluminum alloy, phenomena such as metal carbonization, carburization and electrochemical corrosion may be caused. Therefore, the carbon fiber needs surface treatment before use. The carbon fiber also has properties such as oil resistance, radiation resistance, irradiation resistance, toxic gas absorption and neutron speed reduction.

A carbon fiber may be classified as a polyacrylonitrile-based carbon fiber, a pitch-based carbon fiber, a viscose-based carbon fiber, a phenolic aldehyde-based carbon fiber and a vapor phase growth carbon fiber according to raw material sources; according to properties, the carbon fiber may be classified as a common carbon fiber, a high-strength carbon fiber, a medium-modulus high-strength carbon fiber, a high-modulus carbon fiber and an ultrahigh-modulus carbon fiber; according to states, the carbon fiber may be classified as a filament fiber, a short fiber and a short cut fiber; according to mechanical properties, the carbon fiber may be classified as a common carbon fiber and a high-performance carbon fiber. The common carbon fiber has strength of 1000 MPa and a modulus of about 100 GPa. The high-performance carbon fiber is further classified as a high-strength (strength of 2000 MPa and a modulus of 250 GPa) carbon fiber and a high-modulus carbon fiber (a modulus of 300 GPa or greater). A carbon fiber of which strength is greater than 4000 MPa is also called as an ultrahigh strength carbon fiber; a carbon fiber of which a modulus is greater than 450 GPa is also called as an ultrahigh modulus carbon fiber. Along with development of the space and aeronautics industry, a high-strength high-extension type carbon fiber of which an extension rate is greater than 2% is developed. The Polyacrylonitrile PAN-based carbon fiber is most greatly used. More than 90% of carbon fibers in the market are Polyacrylonitrile PAN-based carbon fibers. As mysterious properties of the carbon fiber are not completely discovered, people cannot make the carbon fiber from carbon or graphite directly, instead organic fibers (such as nylon fibers, acrylic fibers and artificial fibers) with carbon are taken as a raw material, and the organic fibers are combined with plastic resins to be carbonized to produce the carbon fiber. A production process of the Polyacrylonitrile PAN-based carbon fiber mainly includes two procedures of raw fiber production and raw fiber carbonization, namely firstly, a polyacrylonitrile fiber or a raw fiber which is called as a "mother" is produced through a series of processes such as acrylonitrile polymerization and spinning, the raw fiber is oxidized in an oxidation furnace at 200-300 DEG C., and in addition procedures such as carbonization at 1000-2000 DEG C. in a carbonization furnace are also implemented so as to obtain the carbon fiber.

Basic metallic containing mesophase pitch for spinning the pitch-based carbon fiber is developed in America. After a raw fiber is stabilized and carbonized, a carbon fiber has tension strength of 3.5 GPa and a modulus of 252 GPa. A thermal-resistance and high-conductivity mesophase pitch-based carbon fiber is developed in France. A novel method for coating a carbon fiber is developed in Poland, for example, a pitch-based carbon fiber coated by copper is produced by using a mixing method, namely a copper salt is uniformly mixed with isotropous coal pitch firstly, centrifugal spinning is carried out, and a mixture is stabilized in the air and is treated in high-temperature hydrogen, thereby a carbon fiber of alloy copper is produced. Other countries in the world have a small pitch-based carbon fiber production capacity, the pitch-based carbon fiber is studied and developed early in China, however, development, production and application in China are greatly behind those in other countries.

According to different product specifications, the carbon fiber is classified as two types, namely an aerospace carbon fiber and an industrial carbon fiber which are also called as a small fiber bundle and a large fiber bundle. Generally, a carbon fiber of 48K or greater is called as a large-bundle carbon fiber, including 360K, 480K, and the like. In early periods, a carbon fiber of 3K is mainly used as the aerospace carbon fiber, carbon fibers of 12K and 24K are gradually used, and the carbon fiber is mainly applied to national defense and military industries and high technologies such as airplanes, guided missiles, rockets and satellites, and sports leisure products such as fishing rods, ball arms and ball bats. An industrial carbon fiber is applied to different civil industries, including spinning, medicine and health, electromechanical, civil construction, transportation, energy and the like.

An industrial production carbon fiber may be classified as three main types, namely the Polyacrylonitrile PAN-based carbon fiber, the pitch-based carbon fiber and the viscose-based carbon fiber according to a raw material source, and generally the former two carbon fibers are produced. When being prepared from a viscose fiber, a carbon fiber with good mechanical properties needs high-temperature tension graphitization, is low in carbonization yield, large in technical difficulty and complex in apparatus, and is not developed in a large scale because of complex raw material preparation and poor product performance on the basis of rich raw materials and high carbonization yield; a high-performance carbon fiber made of a raw polyacrylonitrile fiber has a production process which is simpler than other methods, and the high-performance carbon fiber has yield which accounts for about 90% or greater of total yield of the carbon fiber all over the world.

The carbon fiber may be prepared from the polyacrylonitrile fiber, the pitch fiber, the viscose fiber or the phenolic aldehyde fiber respectively through carbonization. The polyacrylonitrile fiber and the pitch carbon fiber are mainly widely used. The carbon fiber is made through four procedures, namely fiber spinning, thermal stabilization (pre-oxidation), carbonization and graphitization, along with chemical variations such as dehydrogenation, cyclization, pre-oxidation, oxidation and deoxidation.

When being prepared from the viscose fiber, the carbon fiber with good mechanical properties needs high-temperature tension graphitization and is low in carbonization yield, large in technical difficulty, complex in apparatus, and a product is mainly used as an ablation resistance material and a thermal insulating material; the carbon fiber which is prepared from pitch is rich in raw material source and high in carbonization yield, but is not developed in a large scale either because of complex raw material preparation and poor product performance; the high-performance carbon fiber may be made of the raw polyacrylonitrile fiber, has a production process which is simpler than other methods, is excellent in mechanical property, and is well developed in the carbon fiber industry from the 1960s.

About preparation of the Polyacrylonitrile PAN-based carbon fiber:

The polyacrylonitrile carbon fiber is a carbon fiber made of the polyacrylonitrile fiber as a raw material and is mainly used as a composite material reinforcing body. The carbon fiber may be made of no matter a homopolymerized polyacrylonitrile fiber or a polymerized polyacrylonitrile fiber. In order to produce the high-performance carbon fiber and increase the productivity, generally the polymerized polyacrylonitrile fiber is used as the raw material. The raw material needs to be small in impurity or defect, uniform in fineness, as thin as possible, high in strength and small in broken filament; an axial orientation degree of a chain molecule in a fiber needs to be as high as possible, generally is greater than 80%; the raw material is also good in thermal conversion performance.

In production, the polyacrylonitrile fiber is made through the following procedures: firstly, enabling polyacrylonitrile and other small amounts of a second monomer and a third monomer (methylmethacrylate, methylidine, and the like) to be copolymerized to generate a copolyacrylonitrile resin (of which a molecular weight is greater than 60000-80000), dissolving the resin with solvents (sodium thiocyanate, dimethyl sulfoxide, nitric acid, zinc chloride and the like) so as to obtain a spinning liquid of an appropriate viscosity, spinning by using a wet method, a drying method or a dry-wet method, further washing with water, drawing, drying and carrying out thermal shaping, thereby obtaining the polyacrylonitrile fiber. When directly heated, the polyacrylonitrile fiber is liable to melt, and an original fiber state of the polyacrylonitrile fiber is not kept. When the carbon fiber is made, the polyacrylonitrile fiber is firstly subjected to low-temperature thermal treatment in the air or other oxidizing atmospheres, that is, pre-oxidation treatment. Pre-oxidation treatment is a preparation procedure of fiber carbonization. Generally, the fiber is heated to about 270 DEG C. in the air, the temperature is kept for 0.5 hour to 3 hours, a color of the polyacrylonitrile fiber is turned into yellow and brown from white gradually, and finally a black pre-oxidation fiber is prepared. The black pre-oxidation fiber is a result that linear macromolecules of polyacrylonitrile are subjected to a series of chemical reactions such as oxidation, pyrolysis, crosslinking and cyclization after being heated and oxidized, which form a heat-resistant ladder polymer. The pre-oxidation fiber is further subjected to carbonization treatment at a high treatment temperature of 1600 DEG C. in the presence of nitrogen, then the fiber is further subjected to reactions such as crosslinking cyclization, aromatization and polycondensation, in addition hydrogen atoms, nitrogen atoms and oxygen atoms are desorbed, and then finally a carbon fiber which is of a two-dimensional carbon cycle planar net-shaped structure and a turbostraticgraphitic structure with layer pieces in rough parallel is prepared.

A process for preparing the carbon fiber from the raw PAN fiber includes the following procedures: raw PAN fiber preparation, pre-oxidation, carbonization, graphitization, surface treatment, coiling and carbon fiber collection, namely, I. Raw fiber preparation, the raw polyacrylonitrile fiber and the raw viscose fiber are mainly prepared through wet-method spinning, and the raw pitch fiber and the raw phenolic aldehyde fiber are prepared through melt spinning. The high-performance polyacrylonitrile-based carbon fiber is prepared from the raw polyacrylonitrile fiber with high purity, high strength and uniform quality, and copolymerization monomers such as itaconic acid are adopted to prepare the raw polyacrylonitrile fiber. When an anisotropic high-performance pitch-based carbon fiber is prepared, firstly pitch is pretreated into mesophase pitch, premesophase pitch (benzene-soluble anisotropic pitch), potential mesophase pitch (quinoline-soluble anisotropic pitch), and the like. The raw fiber of the viscose-based carbon fiber as an ablation material needs to be free of alkali metal ion.

II. Pre-oxidation (200-300 DEG C. for the polyacrylonitrile fiber), non-melting (200-400 DEG C. for the pitch) or thermal treatment (240 DEG C. for the viscose fiber), then a thermal-resistant and non-melting fiber is prepared, and the phenolic aldehyde-based carbon fiber is free of the procedure.

III. Carbonization, at temperatures of 1000-1500 DEG C. for the polyacrylonitrile fiber, 1500-1700 DEG C. for the pitch and 400-2000 DEG C. for the viscose fiber.

IV. Graphitization, at temperatures of 2500-3000 DEG C. for the polyacrylonitrile fiber, 2500-2800 DEG C. for the pitch and 3000-3200 DEG C. for the viscose fiber.

V. Surface treatment, gas phase or liquid phase oxidation and the like are carried out to realize chemical activity of a fiber and improve affinity with a resin.

VI. Sizing treatment, to prevent fiber damage and improve affinity with a resin substrate. The obtained fiber has various different cross section structures.

In order to obtain a carbon fiber with good quality, pay attention to the following technical key points:

(1) To achieve high purity, high strength, densification and smooth and flawless surfaces is a primary task in preparing the high-performance carbon fiber. Systematic engineering of the carbon fiber starts from the polymerization monomer of the raw fiber. The quality of the raw fiber both determines properties of the carbon fiber and restricts production cost of the carbon fiber. A high-quality raw PAN fiber is a primary essential condition for preparing the high-performance carbon fiber.

(2) Minimization of impurity defects is a substantial measure for improving the tension strength of the carbon fiber and is also a hot topic studied by scientific and technical workers. In a sense, strength improvement is actually a procedure of reducing and minimizing defects.

(3) In a pre-oxidation process, a pre-oxidation time needs to be shortened as much as possible on premise that homogenization is ensured, and pre-oxidation time shortening is a direction topic for reducing production cost.

(4) High-temperature technologies, high-temperature apparatuses and related important components are studied. A high-temperature carbonization temperature is generally 1300-1800 DEG C., and a graphitization temperature is generally 2500-3000 DEG C. In operation at such high temperatures, both continuous operation is carried out and service lives of the apparatuses need to be prolonged, so that study on new-generation high-temperature technologies and high-temperature apparatuses is particularly significant, such as technologies such as microwaves, plasma and sensitive heating carried out in the presence of an inert gas at an anaerobic state.

According to another aspect of the disclosure, a train is provided, and the train includes the above train window structure.

The above are only preferred embodiments of the disclosure, and are not intended to limit the disclosure. As will occur to those skilled in the art, the disclosure is susceptible to various modifications and changes. Any modifications, equivalent replacements, improvements and the like made within the spirit and principle of the disclosure shall fall within the scope of protection of the disclosure.

What is claimed is:

1. A train window structure, comprising:
   a train window frame;
   train window glass, the train window glass being arranged on the train window frame, and a hollow structure being provided inside of the train window glass;
   a display, arranged in the hollow structure and used for displaying information on the train window structure;
   the train window glass comprises:
   outer layer glass and inner layer glass, wherein the outer layer glass and the inner layer glass are oppositely arranged, and the hollow structure is formed between the outer layer glass and the inner layer glass;
   the train window frame is provided with a first stopping convex rib and a second stopping convex rib, the second stopping convex rib is provided away from the inner layer glass, the first stopping convex rib is provided between the inner layer glass and the second stopping convex rib, and a sealing clamping groove is formed between the second stopping convex rib and the first stopping convex rib;
   the train window structure further comprises:
   a second sealant arranged in the sealing clamping groove, wherein the second sealant comprises a sealing lip that abuts against the inner layer glass, so as to seal a gap formed between the first stopping convex rib and the inner layer glass;
   an end of the first stopping convex rib and an end of the second stopping convex rib are provided with flanges, so as to fix the second sealant;
   wherein the inner layer glass comprises:
   a unidirectional perspective membrane layer, wherein the unidirectional perspective membrane layer is arranged on an inner surface or an outer surface of the inner layer glass.

2. The train window structure as claimed in claim 1, wherein the display comprises a light emitting panel, the light emitting panel being matched with the train window glass.

3. The train window structure as claimed in claim 2, wherein the light emitting panel comprises an Organic Light Emitting Diode (OLED) panel.

4. The train window structure as claimed in claim 1, wherein the train window structure further comprises:
   a connecting piece arranged on the train window frame, and the outer layer glass and the inner layer glass are connected through the connecting piece.

5. The train window structure as claimed in claim 1, wherein the train window structure further comprises:
   a first sealant arranged in the hollow structure to seal a junction of the outer layer glass and the inner layer glass.

6. The train window structure as claimed in claim 4, wherein a first end of the connecting piece is abutted against the first stopping convex rib, the inner layer glass is arranged at the first end of the connecting piece, and the outer layer glass is arranged at a second end of the connecting piece.

7. The train window structure as claimed in claim 1, wherein the train window structure comprises:
   outer layer glass and inner layer glass, wherein the outer layer glass and the inner layer glass are oppositely arranged, and the outer layer glass and the inner layer glass are arranged in a distance;
   a sealing strip, wherein the outer layer glass and the inner layer glass are connected through the sealing strip, the hollow structure is formed among the sealing strip, the outer layer glass and the inner layer glass, and a self-cleaning material layer is arranged on an outer surface of the outer layer glass.

8. The train window structure as claimed in claim 7, wherein the outer layer glass comprises:
   a first polycarbonate plate, wherein the first polycarbonate plate is arranged opposite to the inner layer glass, and the self-cleaning material layer is arranged on an outer surface of the first polycarbonate plate.

9. The train window structure as claimed in claim 8, wherein the outer layer glass further comprises:
   a Polyvinyl Butyral (PVB) membrane layer, wherein one surface of the PVB membrane layer is connected with an inner surface of the first polycarbonate plate;
   a second polycarbonate plate, wherein the other surface of the PVB membrane layer is connected with the second polycarbonate plate, and the second polycarbonate plate is connected with the inner layer glass through the sealing strip.

10. The train window structure as claimed in claim 9, wherein a nano ceramic membrane is arranged on a surface of the first polycarbonate plate and/or the second polycarbonate plate.

11. The train window structure as claimed in claim 8, wherein the outer layer glass further comprises:
- a Polyurethane (PU) membrane layer, wherein one surface of the PU membrane layer is connected with an inner surface of the first polycarbonate plate;
- a second polycarbonate plate, wherein the other surface of the PU membrane layer is connected with the second polycarbonate plate, and the second polycarbonate plate is connected with the inner layer glass through the sealing strip.

12. The train window structure as claimed in claim 11, wherein a nano ceramic membrane is arranged on a surface of the first polycarbonate plate and/or the second polycarbonate plate.

13. The train window structure as claimed in claim 7, wherein the hollow structure is used for accommodating air or argon.

14. The train window structure as claimed in claim 7, wherein the inner layer glass has a thickness L, wherein L is greater than or equal to 3.5 mm and less than or equal to 4.5 mm.

15. The train window structure as claimed in claim 7, wherein the self-cleaning material layer is an anatase titanium dioxide material layer.

16. A train, comprising the train window structure as claimed in claim 1.

\* \* \* \* \*